(12) United States Patent
Horihata et al.

(10) Patent No.: US 11,807,747 B2
(45) Date of Patent: Nov. 7, 2023

(54) FIBER FOR ARTIFICIAL HAIR AND HAIR DECORATING PRODUCT

(71) Applicant: DENKA COMPANY LIMITED, Tokyo (JP)

(72) Inventors: Atsushi Horihata, Kanagawa (JP); Masamich Kanaoka, Kanagawa (JP); Atsushi Takei, Kanagawa (JP); Masashi Kume, Tokyo (JP)

(73) Assignee: Denka Company Limited, Tokyo (JP)

( * ) Notice: Subject to any disclaimer, the term of this patent is extended or adjusted under 35 U.S.C. 154(b) by 391 days.

(21) Appl. No.: 17/046,155

(22) PCT Filed: Apr. 9, 2019

(86) PCT No.: PCT/JP2019/015429
§ 371 (c)(1),
(2) Date: Oct. 8, 2020

(87) PCT Pub. No.: WO2019/235055
PCT Pub. Date: Dec. 12, 2019

(65) Prior Publication Data
US 2021/0171754 A1   Jun. 10, 2021

(30) Foreign Application Priority Data
Jun. 7, 2018 (JP) ................. 2018-109386

(51) Int. Cl.
| | | |
|---|---|---|
| *C08L 27/06* | (2006.01) | |
| *A41G 5/00* | (2006.01) | |
| *C08F 212/10* | (2006.01) | |
| *C08F 220/14* | (2006.01) | |
| *C08L 25/12* | (2006.01) | |
| *C08L 25/14* | (2006.01) | |
| *C08L 51/06* | (2006.01) | |

(52) U.S. Cl.
CPC .............. *C08L 27/06* (2013.01); *A41G 5/004* (2013.01); *C08F 212/10* (2013.01); *C08F 220/14* (2013.01); *C08L 25/12* (2013.01); *C08L 25/14* (2013.01); *C08L 51/06* (2013.01); *C08L 2201/04* (2013.01); *C08L 2201/08* (2013.01); *C08L 2203/12* (2013.01); *C08L 2205/03* (2013.01)

(58) Field of Classification Search
CPC ....... A41G 5/004; A41G 3/0083; C08L 27/06; C08L 51/003; C08L 51/06
See application file for complete search history.

(56) References Cited

U.S. PATENT DOCUMENTS

2013/0298924 A1* 11/2013 Hashimoto ............ A41G 5/004
525/190

FOREIGN PATENT DOCUMENTS

| | | | |
|---|---|---|---|
| JP | H10102317 | A | 4/1998 |
| JP | 2001131824 | A | 5/2001 |
| JP | 2012208136 | A | 10/2012 |
| JP | 2013002014 | A | 1/2013 |
| JP | 2017132996 | A | 8/2017 |
| KR | 20030060464 | A * | 7/2003 |
| WO | 2006038447 | A1 | 4/2006 |
| WO | 2012046748 | A1 | 4/2012 |

OTHER PUBLICATIONS

International Search Report dated Jul. 2, 2019, issued in International Application No. PCT/JP2019/015429, filed Apr. 9, 2019, 2 pages.

* cited by examiner

*Primary Examiner* — Mark S Kaucher
(74) *Attorney, Agent, or Firm* — Christensen O'Connor Johnson Kindness PLLC

(57) ABSTRACT

The present invention provides a fiber for artificial hair and a hair decorating product having superior combing property. A fiber for artificial hair includes vinyl chloride based resin, vinyl based copolymer, and vinyl chloride based acrylic graft copolymer.

9 Claims, No Drawings

FIBER FOR ARTIFICIAL HAIR AND HAIR DECORATING PRODUCT

TECHNICAL FIELD

The present invention relates to a fiber for artificial hair having superior combing property and to a hair decorating product using the fiber for artificial hair.

BACKGROUND

Vinyl chloride based resin fiber obtained by spinning vinyl chloride based resin is superior in flexibility, and is thus used commonly as a fiber for artificial hair structuring a hair decorating product.

However, regarding such vinyl chloride based resin fiber, since the specific gravity of the vinyl chloride based resin as the raw material is large, the fiber obtained was not suitable for hair styles which require volume.

In order to decrease the specific gravity of the vinyl chloride based resin fiber, formulating a vinyl based copolymer having a small specific gravity with the vinyl chloride based resin has been suggested (see for example, Patent Literatures 1 and 2).

CITATION LIST

Patent Literature

[Patent Literature 1] JP 2001-131824A
[Patent Literature 2] WO 2006/038447
[Patent Literature 3] JP 2012-208136A
[Patent Literature 4] JP 2017-132996A

SUMMARY OF INVENTION

Technical Problem

However, depending on the composition ratio of the vinyl based copolymer being formulated, the heat resistance of the fiber for artificial hair obtained would not be sufficient. Accordingly, the fiber for artificial hair would wrinkle when processing into a hair decorating product, thereby being problematic due to restriction in hair styles.

The afore-mentioned problem has been solved by adjusting the composition ratio of the vinyl based copolymer within a particular range. However, when the ratio of the vinyl cyanide bond unit contained in the vinyl based copolymer becomes large, the fiber is easily cut during drawing. Accordingly, it becomes necessary to decrease the maximum drawing ratio, resulting in decrease in strength. Therefore, the fiber is easily cut during combing, which is problematic.

The present invention provides a fiber for artificial hair and a hair decorating product having superior combing property.

Solution to Problem

That is, the present invention is as follows.
(1) A fiber for artificial hair, comprising: vinyl chloride based resin, vinyl based copolymer, and vinyl chloride based acrylic graft copolymer.
(2) The fiber for artificial hair of (1), wherein the vinyl chloride based acrylic graft copolymer is contained by 1 to 20 parts by mass with respect to 100 parts by mass of sum of the vinyl chloride based resin and the vinyl based copolymer.
(3) The fiber for artificial hair of (1) or (2), wherein 100 parts by mass of sum of the vinyl chloride based resin and the vinyl based copolymer contains 50 to 95 parts by mass of the vinyl chloride based resin and 5 to 50 parts by mass of the vinyl based copolymer.
(4) The fiber for artificial hair of any one of (1) to (3), wherein the vinyl chloride based acrylic graft copolymer has an average degree of polymerization of 400 to 1800.
(5) The fiber for artificial hair of any one of (1) to (4), wherein the vinyl chloride based acrylic graft copolymer contains 8 to 55 mass % of acryl based copolymer.
(6) The fiber for artificial hair of any one of (1) to (5), wherein the vinyl based copolymer contains 10 to 85 mass % of aromatic vinyl monomer unit, 0 to 40 mass % of vinyl cyanide monomer unit, and 0 to 85 mass % of methacrylic acid ester monomer unit.
(7) The fiber for artificial hair of (6), wherein the vinyl based copolymer contains 60 to 85 mass % of the aromatic vinyl monomer unit, and 40 to 15 mass % of the vinyl cyanide monomer unit.
(8) The fiber for artificial hair of (6) or (7), wherein the aromatic vinyl monomer unit is derived from styrene, and the vinyl cyanide monomer unit is derived from acrylonitrile.
(9) The fiber for artificial hair of any one of (1) to (8), wherein with respect to 100 parts by mass of sum of the vinyl chloride based resin and the vinyl based copolymer, an antistatic agent is contained by 0.01 to 1 parts by mass, a hydrotalcite based complex heat stabilizer is contained by 0.1 to 5.0 parts by mass, an epoxidized oil is contained by 0.2 to 10.0 parts by mass, and an ester based lubricant is contained by 0.2 to 5.0 parts by mass.
(10) A hair decorating product comprising the fiber for artificial hair of any one of (1) to (9).
(11) The hair decorating product of (10), wherein the hair decorating product is at least one selected from wig, hairpiece, braid, extension hair, and doll hair.

Effect of the Invention

According to the present invention, a fiber for artificial hair and a hair decorating product having superior combing property can be obtained.

DESCRIPTION OF EMBODIMENTS

Hereinafter, embodiments for carrying out the present invention will be explained in detail.

The present invention shall not be limited to the embodiments described below.

1. Fiber for Artificial Hair

The present invention relates to a fiber for artificial hair comprising a resin composition containing a vinyl chloride based resin, a vinyl based copolymer, and a vinyl chloride based acrylic graft copolymer.

<Vinyl Chloride Based Resin>

The vinyl chloride based resin used in the present invention is a conventionally known homopolymer resin of vinyl chloride, or a conventionally known copolymer resin of vinyl chloride and various monomers, and is not particularly limited. As the copolymer resin, copolymer resin of vinyl chloride and vinyl ester such as vinyl chloride-vinyl acetate copolymer resin, vinyl chloride-vinyl propionate copolymer resin and the like; copolymer resin of vinyl chloride and acrylic acid ester such as vinyl chloride-butyl acrylate copolymer resin, vinyl chloride-2-ethylhexyl acrylate copolymer resin and the like; copolymer resin of vinyl chloride and olefin such as vinyl chloride-ethylene copolymer resin, vinyl chloride-propylene copolymer resin and the like; and vinyl chloride-acrylonitrile copolymer resin can be typically mentioned for example. As a preferable vinyl chloride based resin, homopolymer resin which is a homopolymerized product of vinyl chloride, vinyl chloride-ethylene copolymer resin, vinyl chloride-vinyl acetate copolymer resin and the like can be mentioned for example. In the copolymer resin, content of comonomer is not particularly limited, and can be determined in accordance with the forming processability into a fiber, characteristics of the fiber and the like.

The viscosity-average polymerization degree of the vinyl chloride based resin used in the present invention is preferably in the range of 450 to 1700 in terms of achieving sufficient strength as fiber and heat resistance. By adjusting the viscosity-average polymerization degree in this range, decrease in resin strength can be suppressed, thereby improving productivity. In order to achieve these forming processability and fiber characteristics, when a homopolymer resin of polyvinyl chloride is used, the viscosity-average polymerization degree is preferably adjusted in the range of 650 to 1450. When a copolymer is used, the viscosity-average polymerization degree is preferably adjusted in the range of 1000 to 1700, although it depends on the content of the comonomer. The viscosity-average polymerization degree is obtained by dissolving 200 mg of the resin in 50 ml of nitrobenzene, followed by measurement of the specific viscosity of the polymer solution obtained in a thermostatic oven of 30° C. using an Ubbelohde's viscometer, and then calculating the viscosity-average polymerization degree in accordance with JIS-K6721.

The vinyl chloride based resin used in the present invention can be manufactured by emulsion polymerization, bulk polymerization, suspension polymerization and the like. Polymer manufactured by suspension polymerization is preferably in terms of initial coloring property of the fiber. The polymer can be obtained by known methods described in Patent Literature 3 and the like.

<Vinyl Based Copolymer>

As the vinyl based copolymer used in the present invention, copolymer obtained by copolymerizing two or more selected from aromatic vinyl such as styrene, α-methyl styrene, vinyl toluene, ethylstyrene, t-butylstyrene, chlorostyrene and dichlorostyrene; vinyl cyanide such as acrylonitrile, methacrylonitrile, chloroacrylonitrile and the like; acrylic acid ester such as methyl acrylate, ethyl acrylate, butyl acrylate and the like; methacrylic acid ester such as methyl methacrylate, ethyl methacrylate and the like; vinyl carboxylic acid such as acrylic acid, methacrylic acid and the like can be mentioned.

The vinyl based copolymer preferably contains 10 to 85 mass % of aromatic vinyl monomer unit, 0 to 40 mass % of vinyl cyanide monomer unit, and 0 to 85 mass % of methacrylic acid ester monomer unit. When the content is in such range, compatibility with the vinyl chloride resin is improved, resulting in improvement in spinning property. Therefore, stable productivity can be achieved.

The vinyl based copolymer preferably contains 60 to 85 mass % of aromatic vinyl monomer unit and 40 to 15 mass % of vinyl cyanide monomer unit. When the content is in such range, compatibility with the vinyl chloride resin is improved, resulting in improvement in spinning property. Therefore, stable productivity can be achieved.

As the aromatic vinyl monomer unit of the of vinyl copolymer, styrene and substituted styrene such as styrene, α-methyl styrene, vinyl toluene, ethylstyrene, t-butylstyrene, chlorostyrene and dichlorostyrene can be mentioned. Among these, styrene is especially preferable. Styrene allows easy adjustment of resin pressure during spinning, thereby decreasing load applied to the screw. Accordingly, it is possible to secure long-running performance for a long time.

As the vinyl cyanide monomer unit of the vinyl copolymer, acrylonitrile, methacrylonitrile, chloroacrylonitrile and the like can be mentioned. Among these, acrylonitrile is especially preferable. Acrylonitrile allows easy adjustment of resin pressure during spinning, thereby decreasing load applied to the screw. Accordingly, it is possible to secure long-running performance for a long time.

As the methacrylic acid ester monomer unit of the vinyl copolymer, methyl methacrylate, ethyl methacrylate and the like can be mentioned. Among these, methyl methacrylate is especially preferable. Methyl methacrylate has solubility parameter close to that of vinyl chloride resin, and thus can improve transparency of the fiber.

Regarding the formulation ratio of the vinyl chloride based resin and the vinyl based copolymer, it is preferable that 100 parts by mass of the sum of the vinyl chloride based resin and the vinyl based copolymer contains 50 to 95 parts by mass of the vinyl chloride based resin and 5 to 50 parts by mass of the vinyl based copolymer. It is further preferable that the content is 60 to 85 parts by mass of the vinyl chloride based resin and 15 to 40 parts by mass of the vinyl based copolymer. When the content is in such range, the volume of the fiber for artificial hair obtained would be large, and the spinning property of the resin composition is especially superior.

<Vinyl Chloride Based Acrylic Graft Copolymer>

The vinyl chloride based acrylic graft copolymer used in the present invention includes a skeleton polymer derived from (meth)acryl based copolymer and a graft chain derived from vinyl chloride monomer or vinyl chloride monomer blend grafted to the skeleton polymer.

The vinyl chloride based acrylic graft copolymer can be manufactured by a known method such as the one disclosed in Patent Literature 4. By blending vinyl chloride based acrylic graft copolymer to a resin mixture of vinyl chloride based resin and vinyl based copolymer, compatibility of vinyl chloride based resin and vinyl based copolymer can be improved. Accordingly, drawing can be performed without decreasing the drawing magnification. As a result, strength is not degraded, and the fiber can be prevented from being cut during combing.

As the form and structure of vinyl chloride based acrylic graft copolymer, for example, the vinyl chloride based acrylic graft copolymer preferably is in a form of a particle having a core-shell structure, in which the skeleton polymer (derived from (meth)acryl based copolymer) structures the core and the graft chain (derived from vinyl chloride monomer or vinyl chloride monomer blend) structures the shell. When the vinyl chloride based acrylic graft copolymer is in such a form, the resin particle is stable, and the spinning property can be improved when it is blended with the resin mixture of the vinyl chloride based resin and the vinyl based copolymer.

The average degree of polymerization of the vinyl chloride based acrylic graft copolymer is preferably 400 to 1800, more preferably 600 to 1000, and further preferably 600 to 800. When the average degree of polymerization of the vinyl chloride based acrylic graft copolymer is in such range, the spinning property becomes especially superior. Here, the average degree of polymerization is the one obtained in the following manner. The vinyl chloride based acrylic graft copolymer is dissolved in tetrahydrofuran (THF), followed by filtration to remove insoluble component, and then THF of the filtrate is removed by drying. The residual resin is used as the sample to perform measurement in accordance with JIS K-6721 "Testing Methods For Polyvinyl Chloride", thereby obtaining the average degree of polymerization.

The content of the acryl based copolymer in the vinyl chloride based acrylic graft copolymer is preferably 8 to 55 mass %, more preferably 10 to 50 mass %, and further preferably 20 to 45 mass %. When the content is in such range, the spinning property and the combing property becomes especially superior.

Regarding the formulation amount of the vinyl chloride based acrylic graft copolymer it is preferable that the vinyl chloride based acrylic graft copolymer is contained by 1 to 20 parts by mass with respect to 100 parts by mass of the sum of the vinyl chloride based resin and the vinyl based copolymer. It is further preferable that the formulation amount of the vinyl chloride based acrylic graft copolymer is 2 to 15 parts by mass with respect to 100 parts by mass of the sum of the vinyl chloride based resin and the vinyl based copolymer. When the formulation amount is in such range, the spinning property and the combing property becomes especially superior.

The resin composition of the present invention can be blended with antistatic agent, heat stabilizer and lubricant as necessary by a predetermined ratio.

As the antistatic agent used in the present invention, cationic antistatic agent, anionic antistatic agent, and amphoteric antistatic agent can be used. Regarding the formulation amount of the antistatic agent, it is preferable that the antistatic agent is contained by 0.01 to 1 parts by mass with respect to 100 parts by mass of the sum of the vinyl chloride based resin and the vinyl based copolymer. When the formulation amount of the antistatic agent is in such range, generation of static electricity can be suppressed, and thus occurrence of cuts in the fiber during the manufacturing process of the fiber for artificial hair can be suppressed.

As the heat stabilizer used in the present invention, conventionally known heat stabilizers can be used. Among these, it is preferable to use one or two or more selected from Ca—Zn based heat stabilizer, hydrotalcite based heat stabilizer, tin based heat stabilizer, and epoxy based heat stabilizer. The heat stabilizer is used to suppress thermal decomposition during molding, improve long-running performance, and improve color tone of the filament. Here, combined usage of Ca—Zn based heat stabilizer and hydrotalcite based heat stabilizer which are superior in the balance of forming processability and fiber property is especially preferable. Regarding the formulation amount of these heat stabilizers, it is preferable that the heat stabilizers are contained by 0.1 to 5.0 parts by mass with respect to 100 parts by mass of the sum of the vinyl chloride based resin and the vinyl based copolymer. When the formulation amount of the heat stabilizer is in such range, thermal degradation of the fiber for artificial hair obtained can be suppressed, thereby becoming difficult to color yellow. Hydrotalcite based heat stabilizer is specifically a hydrotalcite compound, and is more specifically a complex salt compound formed by magnesium and/or alkali metals with aluminum; or a complex salt compound formed by zinc, magnesium, and aluminum. There is also a complex salt compound having its crystal water dehydrated. Further, the hydrotalcite compound can be natural or synthetic. The method for synthesizing synthetic hydrotalcite compound can be the ones conventionally known.

Among the heat stabilizers, zinc stearate, calcium stearate, zinc 12-hydroxystearate, calcium 12-hydroxystearate and the like can be mentioned as the Ca—Zn based heat stabilizer. ALCAMIZER available from Kyowa Chemical Industry Co., Ltd. can be mentioned as the hydrotalcite based heat stabilizer. Mercaptotin-based heat stabilizers such as dimethyltin mercapto, dimethyltin mercaptide, dibutyltin mercapto, dioctyltin mercapto, dioctyltin mercapto polymer, dioctyltin mercapto acetate and the like; tin malate heat stabilizers such as dimethyltin maleate, dibutyltin maleate, dioctyltin maleate, dioctyltin maleate polymer and the like; tin laurate heat stabilizer such as dimethyltin laurate, dibutyltin laurate, dioctyltin laurate and the like can be mentioned as the tin based heat stabilizer. Epoxidized oil such as epoxidized soybean oil, epoxidized linseed oil and the like can be mentioned as the epoxy based heat stabilizer. Stearoyl benzoylmethane (SBM), dibenzoylmethane (DBM) and the like can be mentioned as the β-diketone based heat stabilizer. Regarding the formulation amount of these heat stabilizers, it is preferable that the heat stabilizers are contained by 0.2 to 10.0 parts by mass with respect to 100 parts by mass of the sum of the vinyl chloride based resin and the vinyl based copolymer.

As the lubricant used in the present invention, conventionally known lubricant can be used. At least one selected among metal soap based lubricant, hydrocarbon based lubricant, higher fatty acid based lubricant, ester based lubricant, and higher alcohol based lubricant is especially preferable. Lubricant suppresses friction with the metal surface of the processing machine and friction between the resin, improves flowability, thereby improving processability. Regarding the formulation amount of the lubricant, it is preferable that the lubricant is contained by 0.2 to 5.0 parts by mass with respect to 100 parts by mass of the sum of the vinyl chloride based resin and the vinyl based copolymer. When the formulation amount of the lubricant is in such range, flowability of the resin composition can be improved, thereby allowing stable molding of the resin composition.

As the metal soap based lubricant, metal soap such as stearates, laurates, palmitates, oleates and the like of Na, Mg, Al, Ca, Ba and the like can be mentioned. As the hydrocarbon based lubricant, polyethylene wax, polypropylene wax and the like can be mentioned. As the higher fatty acid based lubricant, saturated fatty acid such as stearic acid, palmitic acid, myristic acid, lauric acid, capric acid and the like, unsaturated fatty acid such as oleic acid and the like, and mixtures thereof can be mentioned. As the ester based lubricant, ester based lubricant formed by alcohol and fatty acid; pentaerythritol based lubricant such as mono-ester, di-ester, tri-ester, tetra-ester formed by pentaerythritol or dipentaerythritol and higher fatty acids, and mixtures thereof; and montanic acid wax based lubricant such as ester formed by montanic acid and higher alcohol such as stearyl alcohol, palmithyl alcohol, myristyl alcohol, lauryl alcohol, oleyl alcohol and the like can be mentioned.

As the higher alcohol based lubricant, stearyl alcohol, palmithyl alcohol, myristyl alcohol, lauryl alcohol, oleyl alcohol and the like can be mentioned.

Depending on the purpose, the resin composition of the present invention can contain known compounding agent other than the afore-mentioned antistatic agent and the like, to an extent that it does not interfere with the effect of the invention. As an example of such compounding agent, processing aid, plasticizer, reinforcing agent, UV absorber, antioxidant, filler, flame retardant, pigment, initial coloring enhancer, conductivity imparting agent, fragrance and the like can be mentioned.

2. Manufacturing Method of Resin Composition and Fiber for Artificial Hair

In order to obtain the resin composition, antistatic agent, heat stabilizer and lubricant as necessary are blended by a predetermined ratio with the vinyl chloride based resin, vinyl based copolymer, and vinyl chloride based acrylic graft copolymer. The blend is mixed using conventionally known Henschel Mixer, Super Mixer, Ribbon Blender and the like, followed by melt kneading using an extruder, thereby obtaining a pellet compound.

Manufacture of such powder compound can be performed by hot blend or cold blend, and usual conditions can be adopted as the manufacturing conditions. Preferably, in order to suppress volatile components in the resin composition, hot blend is adopted. The pellet compound can be manufactured in a similar manner as ordinary vinyl chloride based pellet compound. For example, kneading machine such as single screw extruder, a counter twin-screw extruder, a conical twin-screw extruder, coaxial twin-screw extruder, ko-kneader, planetary gear extruder, roll kneader and the like can be used to manufacture pellet compound. Manufacturing conditions for manufacturing such pellet compound is not particularly limited, however, it is preferable to set the temperature of the resin at 190° C. or lower so as to prevent thermal degradation of the vinyl chloride based resin. Further, mesh can be arranged at the vicinity of the tip of the screw in order to remove metal pieces of the screw and fibers from protective gloves, which may contaminate in the pellet compound by a small amount.

Cold cut method can be adopted for manufacturing pellets. A measure to remove "machining dust" (fine powder generated when manufacturing pellets) which may contaminate during cold cutting can be adopted. In addition, since the cutter can be nicked and machining dust can be generated by using the cutter for a long period of time, it is preferable to replace the cutter as necessary.

In order to obtain the fiber for artificial hair, the resin composition is subjected to melt spinning by using a nozzle, a weak axis of a sectional area of the nozzle hole having a cross-sectional secondary moment within a predetermined range. The temperature of the cylinder is in the range of 150 to 190° C., and the temperature of the nozzle is in the range of 165 to 195° C. By using such conditions for favorable spinning property, the melt spinning is carried out.

The fiber melt spun from the nozzle hole and undrawn (fiber of resin composition) is introduced into a heated cylinder (temperature of the heated cylinder: approximately 250° C.) and undergoes an instantaneous heat treatment. Then, the fiber is wound using a haul-off machine arranged directly below the nozzle. The haul-off machine is, for example, located approximately 4.5 m below. The strand is kept undrawn. During the winding, the hauling speed is adjusted so that the size of the undrawn fiber is in the range of 194 to 206 dtex.

Here, when the resin composition is made into undrawn fiber, conventionally known extruder can be used. For example, a single screw extruder, a counter twin-screw extruder, a conical twin-screw extruder and the like can be used. Among these, a single screw extruder having a caliber of approximately 35 to 85 mmφ, a conical extruder having a caliber of approximately 35 to 50 mmφ are preferably used. When the caliber is too large, the amount of extrusion becomes large, the nozzle pressure becomes high, and the temperature of the resin becomes high, resulting in degradation of the resin, which is unfavorable.

Then, the undrawn fiber is subjected to drawing by 2 to 4 times using a drawing machine (under atmospheric air, at 90 to 120° C.) Subsequently, heat treatment is performed so that the fiber length becomes 0.5 to 0.9 times, using a heat treatment machine (under atmospheric air, at 110 to 140° C.). Accordingly, the size of the fiber is adjusted to 64 to 69 dtex, thereby giving a fiber for artificial hair.

The fiber for artificial hair according to the present invention thus obtained is improved in terms of volume and heat resistance.

3. Hair Decorating Product

The fiber for artificial hair can be used alone for a hair decorating product, or can be used by blending with human hair or other artificial hair. The hair decorating product is wig, hairpiece, braid, extension hair, doll hair and the like, and the application of the fiber for artificial hair is not particularly limited. In addition, the fiber for artificial hair can be applied for products other than the hair decorating product, such as false beard, false eyelash, false eyebrow and the like.

EXAMPLES

Hereinafter, specific embodiments of the present invention will be described in detail by referring to Examples and Comparative Examples. However, the present invention shall not be limited to these Examples.

<Example 1>

A mixture formulated with vinyl chloride based resin (TH-1000, available from TAIYO VINYL CORPORATION, 70 parts by mass) and vinyl based copolymer resin including 68 mass % of styrene monomer unit and 32 mass % of acrylonitrile monomer unit (GR-AT-6S, available from Denka Company Limited, 30 parts by mass) added with vinyl chloride based acrylic graft copolymer (AG-162E, available from SEKISUI CHEMICAL CO., LTD., average degree of polymerization of 800, acryl based copolymer content of 16%, 5 parts by mass), antistatic agent (NEW ELEGAN ASK, available from NOF CORPORATION, 0.5 parts by mass), hydrotalcite based complex heat stabilizer (CP-410A, available from Nissan Chemical Corporation, 3 parts by mass), epoxidized soybean oil (O-130P, available from ADEKA CORPORATION, 0.5 parts by mass), and ester-based lubricant (EW-100, available from RIKEN VITAMIN CO., LTD., 0.8 parts by mass) was mixed by a ribbon blender. Subsequently, an extruder having a diameter of 40 mm was used to perform compounding, the temperature of the cylinder being in the range of 130 to 170° C., thereby obtaining pellets. The pellets were subjected to melt spinning under the following conditions. That is, a nozzle having a cross-sectional area of 0.06 mm$^2$, having a circular shape, and the number of the nozzle hole being 120 was used; the temperature of the cylinder was in the range of 140 to 190° C.; the temperature of the nozzle was in the range of 165 to 195° C.; the rate of extrusion was 10 kg/hour; and the diameter of the extrusion machine was 30 mm. Then, using a heated cylinder provided directly below the nozzle (atmospheric temperature being 200 to 300° C., which is a favorable condition for spinning property), heat treatment was performed for approximately 0.5 to 1.5 seconds to obtain fiber of 150 dtex. Subsequently, the melt spun fiber was subjected to a drawing step under atmospheric condition of 100° C. until the length of the fiber is 3 times the initial length, and then the drawn fiber was subjected to a heat shrinking step under atmospheric condition of 120° C. to allow the total length of the fiber to shrink to 0.75 times of the length before the heat shrinking step. Accordingly, fiber for artificial hair of 67 dtex was obtained. (ELEGAN is registered trademark.)

With the fiber for artificial hair thus obtained, evaluation of spinning property, volume, and combing property were carried out in accordance with the evaluation method and criteria described hereinafter. The results are shown in Table 1 and Table 2.

<Examples 1 to 23, Comparative Example 1>

Formulation and evaluation results of Examples 1 to 23 and Comparative Example 1 are summarized in Table 1 and Table 2.

68 mass % of styrene monomer unit, 32 mass % of acrylonitrile monomer unit (GR-AT-6S, available from Denka Company Limited)

80 mass % of styrene monomer unit, 20 mass % of acrylonitrile monomer unit (available from applicant)

55 mass % of styrene monomer unit, 45 mass % of acrylonitrile monomer unit (available from applicant)

80 mass % of methyl methacrylate monomer unit, 20 mass % of acrylonitrile monomer unit (available from applicant)

20 mass % of styrene monomer unit, 75 mass % of methyl methacrylate monomer unit, 5 mass % of acrylonitrile monomer unit (available from applicant)

TABLE 1

| Table 1 | | | Example 1 | 2 | 3 | 4 | 5 | 6 | 7 | 8 | 9 | 10 |
|---|---|---|---|---|---|---|---|---|---|---|---|---|
| Formulation | vinyl chloride based resin | parts by mass | 70 | 70 | 70 | 70 | 70 | 70 | 70 | 70 | 70 | 70 |
| | vinyl based copolymer | parts by mass | 30 | 30 | 30 | 30 | 30 | 30 | 30 | 30 | 30 | 30 |
| | vinyl chloride based acrylic graft copolymer | parts by mass | 5 | 0.5 | 1.5 | 12 | 17 | 25 | 5 | 5 | 5 | 5 |
| | | average degree of polymerization | 800 | 800 | 800 | 800 | 800 | 800 | 300 | 400 | 1800 | 2000 |
| | | content of the acryl based copolymer (mass %) | 16 | 16 | 16 | 16 | 16 | 16 | 16 | 16 | 16 | 16 |
| formulation ratio of vinyl based copolymer | styrene monomer unit | mass % | 68 | 68 | 68 | 68 | 68 | 68 | 68 | 68 | 68 | 80 |
| | methyl methacrylate monomer unit | mass % | 0 | 0 | 0 | 0 | 0 | 0 | 0 | 0 | 0 | 0 |
| | acrylonitrile monomer unit | mass % | 32 | 32 | 32 | 32 | 32 | 32 | 32 | 32 | 32 | 20 |
| Evaluation | spinning property | | S | S | S | S | A | B | B | A | A | B |
| | combing property | | S | B | A | S | S | S | S | S | S | S |
| | volume | | A | A | A | A | A | A | A | A | A | A |

<Vinyl Chloride Based Acrylic Graft Copolymer>

TABLE 2

| Table 2 | | | Example 11 | 12 | 13 | 14 | 15 | 16 | 17 | 18 | 19 | 20 | 21 | 22 | 23 | Comparative Example 1 |
|---|---|---|---|---|---|---|---|---|---|---|---|---|---|---|---|---|
| Formulation | vinyl chloride based resin | parts by mass | 70 | 70 | 70 | 70 | 70 | 98 | 95 | 55 | 40 | 70 | 70 | 70 | 70 | 70 |
| | vinyl based copolymer | parts by mass | 30 | 30 | 30 | 30 | 30 | 2 | 5 | 45 | 60 | 30 | 30 | 30 | 30 | 30 |
| | vinyl chloride based acrylic graft copolymer | parts by mass | 5 | 5 | 5 | 5 | 5 | 5 | 5 | 5 | 5 | 5 | 5 | 5 | 5 | 0 |
| | | average degree of polymerization | 800 | 800 | 800 | 800 | 800 | 800 | 800 | 800 | 800 | 800 | 800 | 800 | 800 | — |
| | | content of the acryl based copolymer (mass %) | 3 | 8 | 40 | 55 | 70 | 16 | 16 | 16 | 16 | 16 | 16 | 16 | 16 | — |
| formulation ratio of vinyl based copolymer | styrene monomer unit | mass % | 68 | 68 | 68 | 68 | 68 | 68 | 68 | 68 | 68 | 80 | 55 | 0 | 20 | 68 |
| | methyl methacrylate monomer unit | mass % | 0 | 0 | 0 | 0 | 0 | 0 | 0 | 0 | 0 | 0 | 0 | 80 | 75 | 0 |
| | acrylonitrile monomer unit | mass % | 32 | 32 | 32 | 32 | 32 | 32 | 32 | 32 | 32 | 20 | 45 | 20 | 5 | 32 |
| Evaluation | spinning property | | S | S | S | A | B | S | S | A | B | S | A | S | S | S |
| | combing property | | B | A | S | S | S | S | S | S | S | S | S | S | S | X |
| | volume | | A | A | A | A | A | C | B | S | S | A | A | A | A | A |

As the materials described in Table 1 and Table 2, the followings were used.

<Vinyl Chloride Based Resin> vinyl chloride based resin (TH-1000, available from TAIYO VINYL CORPORATION)

<Vinyl Based Copolymer>

Vinyl chloride based acrylic graft copolymer (AG-162E, available from SEKISUI CHEMICAL CO., LTD., average degree of polymerization of 800, acryl based copolymer content of 16%)

For others than mentioned above, vinyl chloride based acrylic graft copolymer was prepared by the applicant (vinyl chloride based acrylic graft copolymer having a combination of average degree of polymerization of 300, 400, 800, 1800, and 2000 with acryl based copolymer content of 3, 8, 16, 40, 55, and 70% were prepared.)

The evaluation method and criteria for each of the evaluation items in Table 1 and Table 2 are as follows.

(1) Spinning Property

Spinning property was evaluated by observing occurrence of fiber cuts during melt spinning until the undrawn fiber was obtained. The evaluation criteria are as follows.

S: occurrence of fiber cut was once/1 hour
A: occurrence of fiber cut was 2 to 3 times/1 hour
B: occurrence of fiber cut was 4 to 5 times/1 hour
X: occurrence of fiber cut was 6 times or more/1 hour (2) Combing Property Combing property was evaluated by observing occurrence of fiber cuts when combing was carried out for 50 times using a fiber bundle sample prepared by bundling 20.0 g of fiber for artificial hair having 300 mm length. The evaluation criteria are as follows.

S: no occurrence of fiber cut
A: fiber cut occurred at 2 to 3 places
B: fiber cut occurred at 4 to 5 places
X: fiber cut occurred at 6 places or more (3) Volume Volume was evaluated by fully filling the fiber cut in 100 mm length into a container of 56 cc (100 mm×14 mm×40 mm), and then the filled fiber was taken out of the container to weigh the filled fiber, followed by calculation of specific volume area using the following equation. The value of specific volume area was rounded to the second decimal place. The evaluation criteria are as follows.

volume of container (cc)/weight of fiber (g)=specific volume area (cc/g)

S: specific volume area is 2.5 (cc/g) or more
A: specific volume area is 2.0 to 2.4 (cc/g)
B: specific volume area is 1.7 to 1.9 (cc/g)
C: specific volume area is 1.4 to 1.6 (cc/g)
X: specific volume area is 1.3 (cc/g) or less In all of the Examples, superior results were obtained for all of the evaluation properties. On the other hand, in Comparative Example 1 not containing vinyl chloride based acrylic graft copolymer, combing property was inferior.

Fiber for artificial hair of the Examples were used to prepare wig, hairpiece, braid, extension hair, and doll hair by conventionally known method. Hair decorating products thus obtained had superior combing property.

The invention claimed is:

1. A fiber for artificial hair, comprising: vinyl chloride based resin, vinyl based copolymer, and vinyl chloride based acrylic graft copolymer,
   wherein the vinyl chloride based acrylic graft copolymer has an average degree of polymerization of 600 to 1000, and
   the vinyl chloride based acrylic graft copolymer is contained by 1 to 12 parts by mass with respect to 100 parts by mass of sum of the vinyl chloride based resin and the vinyl based copolymer.

2. The fiber for artificial hair of claim 1, wherein 100 parts by mass of sum of the vinyl chloride based resin and the vinyl based copolymer contains 50 to 95 parts by mass of the vinyl chloride based resin and 5 to 50 parts by mass of the vinyl based copolymer.

3. The fiber for artificial hair of claim 1, wherein the vinyl chloride based acrylic graft copolymer contains 8 to 55 mass % of acryl based copolymer.

4. The fiber for artificial hair of claim 1, wherein the vinyl based copolymer contains 10 to 85 mass % of aromatic vinyl monomer unit, 0 to 40 mass % of vinyl cyanide monomer unit, and 0 to 85 mass % of methacrylic acid ester monomer unit.

5. The fiber for artificial hair of claim 4, wherein the vinyl based copolymer contains 60 to 85 mass % of the aromatic vinyl monomer unit, and 40 to 15 mass % of the vinyl cyanide monomer unit.

6. The fiber for artificial hair of claim 4, wherein the aromatic vinyl monomer unit is derived from styrene, and the vinyl cyanide monomer unit is derived from acrylonitrile.

7. The fiber for artificial hair of claim 1, wherein with respect to 100 parts by mass of sum of the vinyl chloride based resin and the vinyl based copolymer, an antistatic agent is contained by 0.01 to 1 parts by mass, a hydrotalcite based complex heat stabilizer is contained by 0.1 to 5.0 parts by mass, an epoxidized oil is contained by 0.2 to 10.0 parts by mass, and an ester based lubricant is contained by 0.2 to 5.0 parts by mass.

8. A hair decorating product comprising the fiber for artificial hair of claim 1.

9. The hair decorating product of claim 8, wherein the hair decorating product is at least one selected from wig, hairpiece, braid, extension hair, and doll hair.

* * * * *